US008930077B2

(12) United States Patent
Sakamaki (10) Patent No.: US 8,930,077 B2
(45) Date of Patent: Jan. 6, 2015

(54) HYDRAULIC POWER STEERING SYSTEM (71) Applicant: JTEKT Corporation, Osaka-shi, Osaka (JP)

(72) Inventor: Masahiko Sakamaki, Yao (JP)

(73) Assignee: JTEKT Corporation, Osaka (JP)

( * ) Notice: Subject to any disclaimer, the term of this patent is extended or adjusted under 35 U.S.C. 154(b) by 70 days.

(21) Appl. No.: 13/679,309

(22) Filed: Nov. 16, 2012

(65) Prior Publication Data

US 2013/0138297 A1    May 30, 2013

(30) Foreign Application Priority Data

Nov. 24, 2011    (JP) ................................. 2011-256424

(51) Int. Cl.
*B62D 6/08* (2006.01)
*B62D 5/09* (2006.01)

(52) U.S. Cl.
CPC ... *B62D 6/08* (2013.01); *B62D 5/09* (2013.01)
USPC ................ 701/41; 701/23; 701/32.9; 701/42; 701/48; 701/52; 180/400; 180/441; 180/443; 180/446

(58) Field of Classification Search
CPC ........ B60W 30/00; B60W 30/02; D62D 5/09; D62D 5/463; D62D 6/03; D62D 6/10
USPC ........... 701/23, 32.9, 41, 42, 48, 52; 180/400, 180/441, 443, 446
See application file for complete search history.

(56) References Cited

U.S. PATENT DOCUMENTS

| 5,913,375 | A  | * | 6/1999  | Nishikawa ..................... 180/168 |
| 5,975,541 | A  | * | 11/1999 | Harara et al. .............. 280/5.524 |
| 6,295,493 | B1 | * | 9/2001  | Kawazoe ......................... 701/38 |
| 7,860,624 | B2 | * | 12/2010 | Kubota et al. ................... 701/41 |
| 8,019,518 | B2 | * | 9/2011  | Yamazaki ........................ 701/51 |
| 8,494,715 | B2 | * | 7/2013  | Kariatsumari et al. ......... 701/41 |
| 8,534,397 | B2 | * | 9/2013  | Grajkowski et al. ......... 180/54.1 |
| 2002/0007239 | A1 | * | 1/2002 | Matsumoto et al. ............ 701/41 |
| 2003/0173138 | A1 | * | 9/2003 | Loh et al. ...................... 180/417 |
| 2005/0209750 | A1 | * | 9/2005 | Masamura et al. ............. 701/38 |
| 2006/0069481 | A1 | * | 3/2006 | Kubota et al. ................... 701/41 |
| 2007/0198153 | A1 | * | 8/2007 | Oya et al. ........................ 701/41 |
| 2008/0006469 | A1 | * | 1/2008 | Sasaki et al. .................. 180/428 |

(Continued)

FOREIGN PATENT DOCUMENTS

WO   WO 2006/069922 A2    7/2006

OTHER PUBLICATIONS

Feb. 7, 2014 Extended European Search Report issued in European Patent Application No. 12193812.0.

*Primary Examiner* — John R Olszewski
*Assistant Examiner* — Truc M Do
(74) *Attorney, Agent, or Firm* — Oliff PLC (57) ABSTRACT

A damping control unit sets a damping torque command value that corresponds to a steering angular velocity when a direction of a detected steering torque is a turning direction, a magnitude of the detected steering torque is larger than or equal to a first threshold, a direction of the steering angular velocity is a returning direction and a magnitude of the steering angular velocity is higher than or equal to a second threshold. An addition unit adds the damping torque command value generated by the damping control unit to a basic assist torque command value set by a basic assist torque command value setting unit.

3 Claims, 6 Drawing Sheets

(56) References Cited

U.S. PATENT DOCUMENTS

2008/0308341 A1* 12/2008 Linkenbach et al. ......... 180/441
2009/0037053 A1* 2/2009 Yamazaki ....................... 701/41
2009/0114471 A1* 5/2009 Nagase et al. ................ 180/446
2010/0094505 A1* 4/2010 Kariatsumari et al. ......... 701/41
2010/0152971 A1 6/2010 Shiino et al.
2010/0191423 A1* 7/2010 Koyama et al. ................. 701/42
2010/0222960 A1* 9/2010 Oida et al. ...................... 701/29

* cited by examiner

HYDRAULIC POWER STEERING SYSTEM

INCORPORATION BY REFERENCE/RELATED APPLICATION

This application claims priority to Japanese Patent Application No. 2011-256424 filed on Nov. 24, 2011 the disclosure of which, including the specification, drawings and abstract, is incorporated herein by reference in its entirety.

BACKGROUND OF THE INVENTION

1. Field of the Invention

The invention relates to a hydraulic power steering system.

2. Discussion of Background

There is a conventional hydraulic power steering system that generates a steering assist force by supplying hydraulic fluid from a hydraulic pump via a hydraulic control valve to a power cylinder that is coupled to a steering mechanism of a vehicle. In a commonly-used hydraulic power steering system, a hydraulic control valve is mechanically coupled to a steering member, such as a steering wheel, via a steering shaft, and the opening degree of the hydraulic control valve is adjusted in response to an operation of the steering member. Japanese Patent Application Publication No. 2006-306239 (JP 2006-306239 A) describes a hydraulic power steering system that controls the opening degree of a hydraulic control valve with the use of an electric motor (valve driving motor) without mechanically coupling the hydraulic control valve to a steering member. In such a hydraulic power steering system, a steering assist force command value (assist torque command value) is computed on the basis of for example, a steering torque and a vehicle speed. Then, an opening degree command value for the hydraulic control valve is computed on the basis of the steering assist force command value, and drive control (angular position control) of the valve driving motor is executed on the basis of the opening degree command value. An electric motor (pump driving motor) for driving a hydraulic pump is controlled on the basis of a pump rotation speed command value computed from a steering angular velocity (rotation speed feedback control).

In the hydraulic power steering system in which the opening degree of the hydraulic control valve is controlled by the valve driving motor, when the steering member is quickly returned from a turned state toward a neutral position by self-aligning torque, the flow rate of hydraulic fluid that is supplied to a power cylinder may be insufficient due to an insufficient opening degree of the hydraulic control valve. If the flow rate of hydraulic fluid becomes insufficient as described above, shortage of a steering assist force in a turning direction occurs. As a result, a driver feels a sense of discomfort.

SUMMARY OF THE INVENTION

The invention provides a hydraulic power steering system that is able to avoid a shortage of a steering assist force in a turning direction when a steering member is returned from a turned state toward a neutral position.

According to a feature of an example of the invention, when a direction of a steering torque is a turning direction, a magnitude of the steering torque is larger than or equal to a first threshold, a direction of a steering angular velocity is a returning direction and a magnitude of the steering angular velocity is higher than or equal to a second threshold, damping control for increasing a steering assist force in the turning direction is executed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
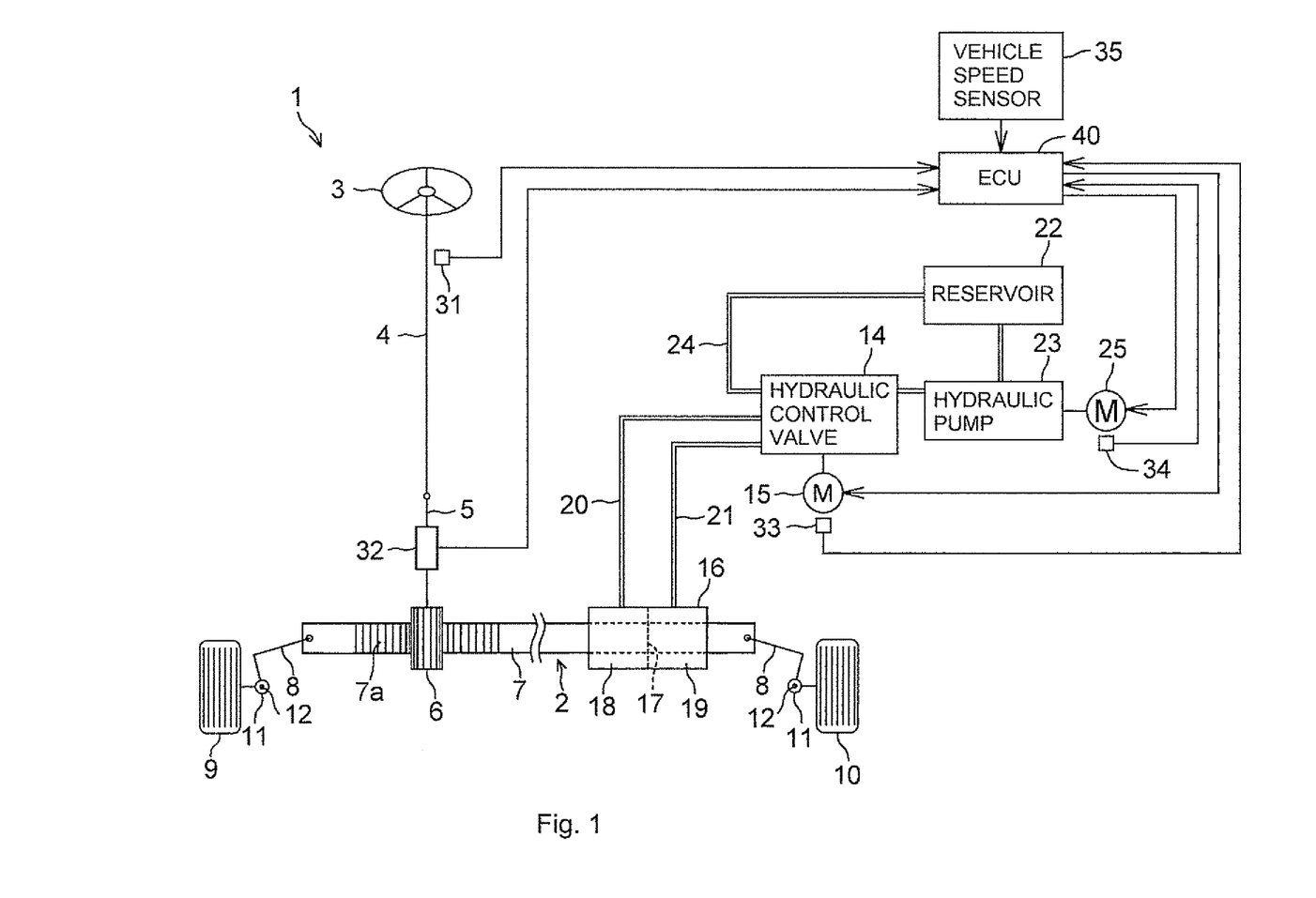
FIG. 1 is a schematic view that shows the schematic configuration of a hydraulic power steering system according to an embodiment of the invention.

FIG. 1 is a schematic view that shows the schematic configuration of a hydraulic power steering system 1 according to an embodiment of the invention. The hydraulic power steering system 1 is used to apply a steering assist force to a steering mechanism 2 of a vehicle. The steering mechanism 2 includes a steering wheel 3, a steering shaft 4, a pinion shaft 5 and a rack shaft 7. The steering wheel 3 serves as a steering member, and is operated by a driver in order to steer the vehicle. The steering shaft 4 is coupled to the steering wheel 3. The pinion shaft 5 is coupled to a distal end portion of the steering shaft 4, and has a pinion gear 6. The rack shaft 7 has a rack 7a that is in mesh with the pinion gear 6, and serves as a steered shaft that extends in a lateral direction of the vehicle.

Tie rods 8 are coupled to respective ends of the rack shaft 7. The tie rods 8 are coupled to knuckle arms 11 that support right and left steered wheels 9, 10. Each of the knuckle arms 11 is provided so as to be pivotable about a corresponding one of kingpins 12. When the steering wheel 3 is operated to rotate the steering shaft 4, the rotation is converted by the pinion gear 6 and the rack 7a into a linear motion in the axial direction of the rack shaft 7. The linear motion is converted into a pivot motion of each knuckle arm 11 about the corresponding kingpin 12. As a result, the right and left steered wheels 9, 10 are steered.

A steering angle sensor 31 is arranged around the steering shaft 4. The steering angle sensor 31 is used to detect a steering angle $\theta h$ that is the rotation angle of the steering shaft 4. In the present embodiment, the steering angle sensor 31 is used to detect a rotation amount (rotation angle) of the steering shaft 4 in each of forward and reverse directions from a neutral position of the steering shaft 4. The steering angle sensor 31 outputs an amount of rotation to the left from the neutral position as a positive value, and outputs an amount of rotation to the right from the neutral position as a negative value. The pinion shaft 5 is provided with a torque sensor 32 that is used to detect a steering torque Th.

The hydraulic power steering system 1 includes a hydraulic control valve 14, a power cylinder 16 and a hydraulic pump 23. The hydraulic control valve 14 is, for example, a rotary valve, and includes a rotor housing (not shown) and a rotor (not shown) for changing a direction in which hydraulic fluid flows. The opening degree of the hydraulic control valve 14 is controlled by rotating the rotor of the hydraulic control valve 14 with the user of an electric motor 15 (hereinafter, referred to as "valve driving motor 15"). The valve driving motor 15 is formed of a three-phase brushless motor. A rotation angle sensor 33 is arranged near the valve driving motor 15. The rotation angle sensor 33 is formed of, for example, a resolver, and is used to detect a rotation angle θB of the rotor of the valve driving motor 15.

The hydraulic control valve 14 is connected to the power cylinder 16 that applies a steering assist force to the steering mechanism 2. The power cylinder 16 is coupled to the steering mechanism 2. Specifically, the power cylinder 16 has a piston 17 and a pair of cylinder chambers 18, 19. The piston 17 is provided integrally with the rack shaft 7. The cylinder chambers 18, 19 are separated from each other by the piston 17. The cylinder chambers 18, 19 both are connected to the hydraulic control valve 14 via fluid passages 20, 21, respectively.

The hydraulic control valve 14 is arranged in a middle portion of a fluid circulation passage 24 that passes through a reservoir 22 and the hydraulic pump 23 that is used to generate a steering assist force. The hydraulic pump 23 is formed of, for example, a gear pump, and is driven by an electric motor 25 (hereinafter, referred to as "pump driving motor 25") to draw the hydraulic fluid stored in the reservoir 22 and supply the hydraulic fluid to the hydraulic control valve 14. Excess hydraulic fluid is returned from the hydraulic control valve 14 to the reservoir 22 via the fluid circulation passage 24.

The pump driving motor 25 is rotated in one direction to drive the hydraulic pump 23. Specifically, the output shaft of the pump driving motor 25 is coupled to the input shaft of the hydraulic pump 23. When the output shaft of the pump driving motor 25 rotates, the input shaft of the hydraulic pump 23 rotates and the hydraulic pump 23 is driven. The pump driving motor 25 is formed of a three-phase brushless motor. A rotation angle sensor 34 is arranged near the pump driving motor 25. The rotation angle sensor 34 is formed of, for example, a resolver, and is used to detect a rotation angle θP of the rotor of the pump driving motor 25.

When the rotor of the hydraulic control valve 14 is rotated by the valve driving motor 15 in one direction from a reference rotation angular position (neutral position), the hydraulic control valve 14 supplies the hydraulic fluid to one of the cylinder chambers 18, 19 of the power cylinder 16 via a corresponding one of the fluid passages 20, 21, and returns the hydraulic fluid in the other one of the cylinder chambers 18, 19 to the reservoir 22. On the other hand, when the rotor of the hydraulic control valve 14 is rotated by the valve driving motor 15 in the other direction from the neutral position, the hydraulic control valve 14 supplies hydraulic pressure to the other one of the cylinder chambers 18, 19 via the other one of the fluid passages 20, 21, and returns the hydraulic fluid in the one of the cylinder chambers 18, 19 to the reservoir 22.

When the rotor of the hydraulic control valve 14 is at the neutral position, the hydraulic control valve 14 is in a so-called balanced state. Therefore, steering is neutral, both the cylinder chambers 18, 19 of the power cylinder 16 are kept at an equal pressure, and the hydraulic fluid circulates through the fluid circulation passage 24. When the rotor of the hydraulic control valve 14 is rotated by the valve driving motor 15, the hydraulic fluid is supplied to one of the cylinder chambers 18, 19 of the power cylinder 16, and the piston 17 moves in the vehicle width direction (the lateral direction of the vehicle). As a result, a steering assist force acts on the rack shaft 7.

The valve driving motor 15 and the pump driving motor 25 are controlled by an ECU 40. The steering angle θh detected by the steering angle sensor 31, the steering torque Th detected by the torque sensor 32, a signal output from the rotation angle sensor 33, a signal output from the rotation angle sensor 34, a vehicle speed V detected by a vehicle speed sensor 35, a signal output from a current sensor 36 (see FIG. 2), and the like, are input into the ECU 40. The current sensor 26 is used to detect a current that flows through the valve driving motor 15.

Figure 2:
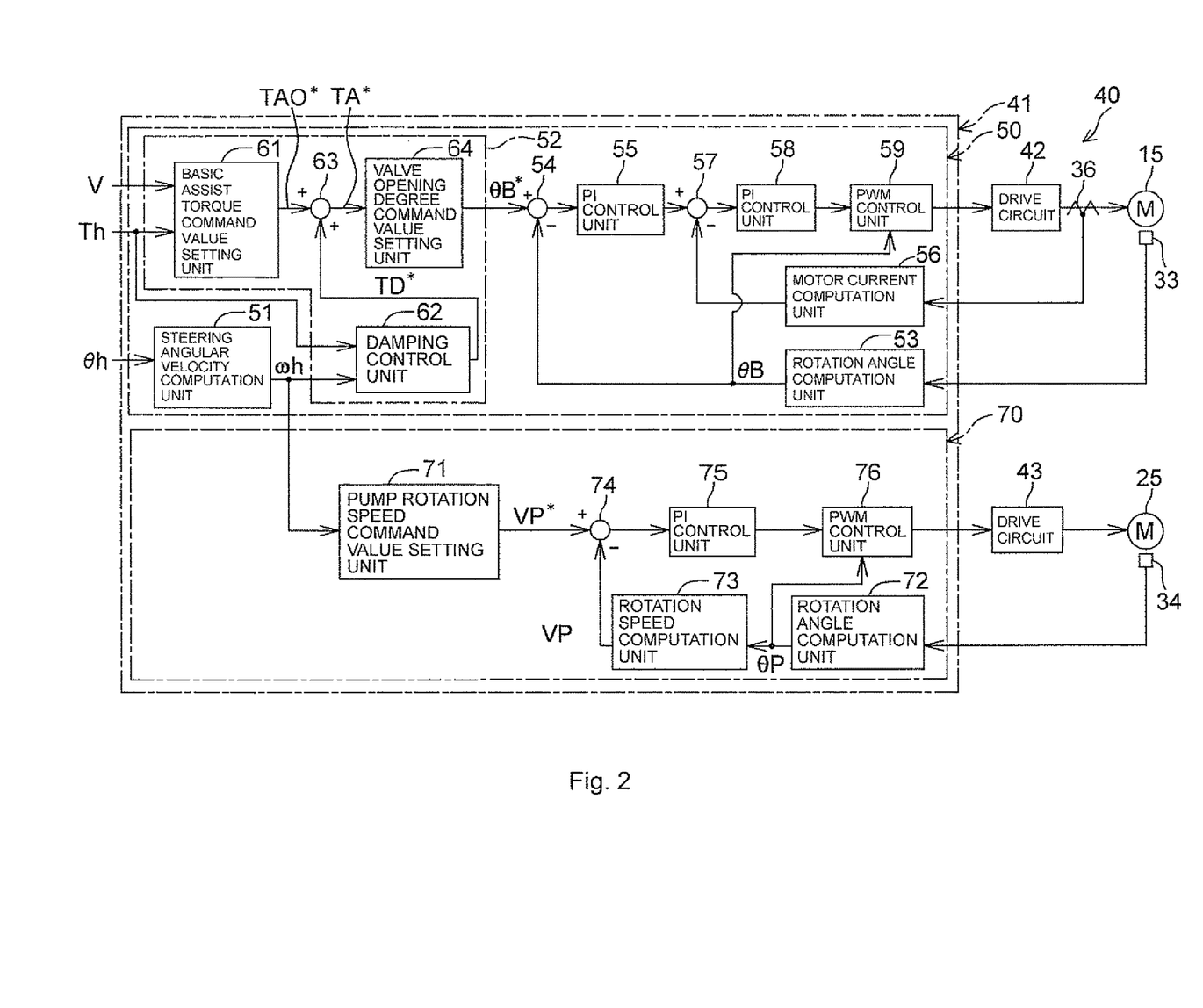
FIG. 2 is a block diagram that shows the electrical configuration of an ECU.

FIG. 2 is a block diagram that shows the electrical configuration of the ECU 40. The ECU 40 includes a microcomputer 41, a drive circuit (inverter circuit) 42 and a drive circuit (inverter circuit) 43. The drive circuit 42 is controlled by the microcomputer 41, and supplies electric power to the valve driving motor 15. The drive circuit 43 is controlled by the microcomputer 41, and supplies electric power to the pump driving motor 25.

The microcomputer 41 includes a CPU and memories (a ROM, a RAM, and the like), and executes predetermined programs to function as a plurality of functional processing units. The functional processing units include a valve driving motor control unit 50 that controls the valve driving motor 15 via the drive circuit 42, and a pump driving motor control unit 70 that controls the pump driving motor 25 via the drive circuit 43.

The valve driving motor control unit 50 includes a steering angular velocity computation unit 51, a valve opening degree command value computation unit 52, a rotation angle computation unit 53, a rotation angular deviation computation unit 54, a PI control unit 55, a motor current computation unit 56, a current deviation computation unit 57, a PI control unit 58, and a PWM control unit 59. The steering angular velocity computation unit 51 subjects a value output from the steering angle sensor 31 to temporal differentiation to compute a steering angular velocity.

The valve opening degree command value computation unit 52 is used to compute a valve opening degree command value, and includes a basic assist torque command value setting unit 61, a damping control unit 62, an addition unit 63 and a valve opening degree command value setting unit 64. The basic assist torque command value setting unit 61 sets a basic assist torque command value TAO* on the basis of a detected steering torque Th detected by the torque sensor 32 and a vehicle speed V detected by the vehicle speed sensor 35. The basic assist torque command value TAO* is a command value of basic assist torque that should be generated by the power cylinder 16.

Figure 3:
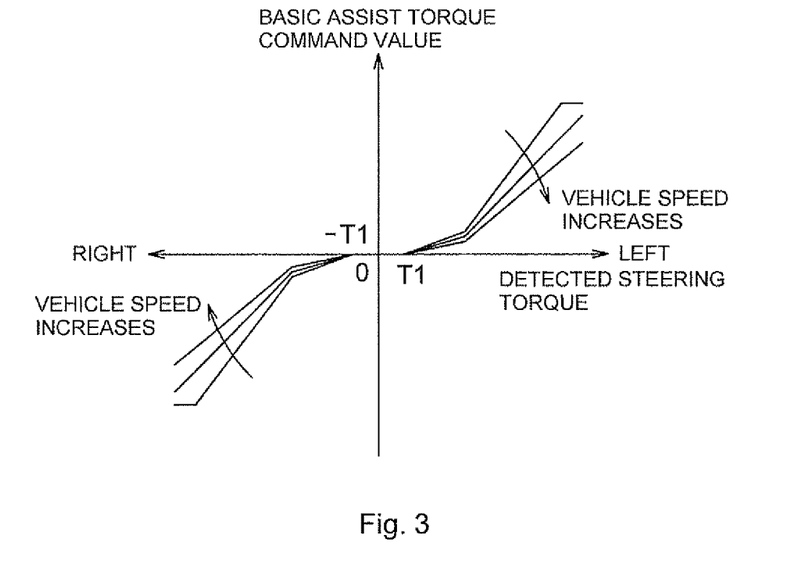
FIG. 3 is a graph that shows an example of a manner of setting a basic assist torque command value with respect to a detected steering torque.

Specifically, the basic assist torque command value setting unit 61 sets the basic assist torque command value TAO* on the basis of a map that stores the correlation between the detected steering torque and the assist torque command value for each vehicle speed. FIG. 3 is a graph that shows an example of a manner of setting the basic assist torque command value with respect to the detected steering torque. The detected steering torque Th is expressed, for example, such that torque for steering to the left takes a positive value and torque for steering to the right takes a negative value. In addition, the basic assist torque command value TAO* takes a positive value when assist torque for steering to the left is generated by the power cylinder 16, and takes a negative value when assist torque for steering to the right is generated by the power cylinder 16.

The basic assist torque command value TAO* with respect to a positive value of the detected steering torque Th takes a positive value, and the basic assist torque command value TAO* with respect to a negative value of the detected steering torque Th takes a negative value. When the detected steering torque Th is a small value that falls within the range of −T1 to T1, the basic assist torque command value TAO* is set to zero. When the detected steering torque Th falls outside the range of −T1 to T1, the basic assist torque command value TAO* is set such that the absolute value of the basic assist torque command value TAO* increases as the absolute value of the detected steering torque Th increases. In addition, the basic assist torque command value TAO* is set such that the absolute value of the basic assist torque command value TAO* decreases as the vehicle speed V detected by the vehicle speed sensor 35 increases.

The basic assist torque command value TAO* set by the basic assist torque command value setting unit 61 is transmitted to the addition unit 63. The damping control unit 62 is used to generate a damping control value (in the present embodiment, a damping torque command value TD*) for increasing a steering assist force in a turning direction when the steering wheel 3 is returned from a turned state toward the neutral position. That is, the damping control unit 62 generates the damping torque command value TD* on the basis of the steering angular velocity ωh computed by the steering angular velocity computation unit 51 and the detected steering torque Th detected by the torque sensor 32. Specifically, the damping control unit 62 sets the damping torque command value TD* that corresponds to the steering angular velocity ωh when the direction of the detected steering torque Th is the turning direction, the magnitude (absolute value) of the detected steering torque Th is larger than or equal to a first threshold A1 (A1>0), the direction of the steering angular velocity ωh is a returning direction and the magnitude (absolute value) of the steering angular velocity ωh is higher than or equal to a second threshold B1 (B1>0). The details of an operation of the damping control unit 62 will be described later.

The damping torque command value TD* generated by the damping control unit 62 is transmitted to the addition unit 63. The addition unit 63 adds the damping torque command value TD* generated by the damping control unit 62 to the basic assist torque command value TAO* set by the basic assist torque command value setting unit 61. The result of addition is transmitted to the valve opening degree command value setting unit 64 as an assist torque command value TA* that is obtained by correcting, for damping control, the basic assist torque command value TAO*. Thus, the basic assist torque command value setting unit 61, the damping control unit 62 and the addition unit 63 constitute assist torque command value setting means.

The valve opening degree command value setting unit 64 sets a valve opening degree command value (motor rotation angle command value) θB* on the basis of the assist torque command value TA* computed by the addition unit 63. The valve opening degree command value θB* is a command value of the opening degree of the hydraulic control valve 14 (command value of the rotation angle of the valve driving motor 15). In the present embodiment, the rotation angle of the valve driving motor 15 at the time when the rotor of the hydraulic control valve 14 is at the neutral position is zero degrees (0°). Then, when the rotation angle of the valve driving motor 15 is larger than 0°, the opening degree of the hydraulic control valve 14 is controlled such that assist torque for steering to the left is generated by the power cylinder 16. On the other hand, when the rotation angle of the valve driving motor 15 is smaller than 0°, the opening degree of the hydraulic control valve 14 is controlled such that assist torque for steering to the right is generated by the power cylinder 16. Note that, as the absolute value of the rotation angle of the valve driving motor 15 increases, the absolute value of the assist torque that is generated by the power cylinder 16 increases.

Figure 4:
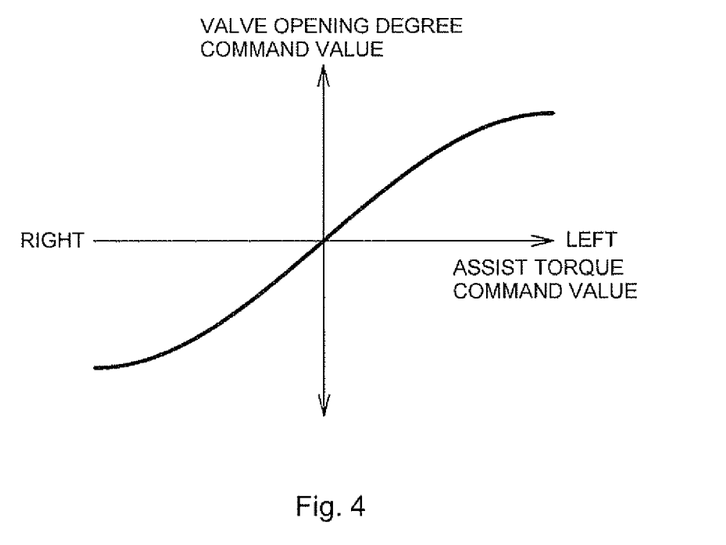
FIG. 4 is a graph that shows an example of a manner of setting a valve opening degree command value with respect to an assist torque command value.

The valve opening degree command value setting unit 64 sets the valve opening degree command value θB* on the basis of a map that stores the correlation between the assist torque command value TA* and the valve opening degree command value θB*. FIG. 4 is a graph that shows an example of a manner of setting the valve opening degree command value θB* with respect to the assist torque command value TA*. The valve opening degree command value θB* with respect to a positive value of the assist torque command value TA* takes a positive value, and the valve opening degree command value θB* with respect to a negative value of the assist torque command value TA* takes a negative value. The valve opening degree command value θB* is set such that the absolute value of the valve opening degree command value θB* increases as the absolute value of the assist torque command value TA* increases.

The rotation angle computation unit 53 computes a rotation angle θB of the valve driving motor 15 on the basis of a signal output from the rotation angle sensor 33. The rotation angular deviation computation unit 54 computes a deviation ΔθB (=θB*−θB) between the valve opening degree command value θB* set by the valve opening degree command value setting unit 64 and the rotation angle θB of the valve driving motor 15, which is computed by the rotation angle computation unit 53. The PI control unit 55 carries out PI computation on the rotation angular deviation ΔθB computed by the rotation angular deviation computation unit 54. That is, the rotation angular deviation computation unit 54 and the PI control unit 55 constitute rotation angle feedback control means for bringing the rotation angle θB of the valve driving motor 15 to the valve opening degree command value θB*. The PI control unit 55 carries out PT computation on the rotation angular deviation ΔθB to compute a current command value for the valve driving motor 15.

The motor current computation unit 56 detects a motor current that flows through the valve driving motor 15 on the basis of a signal output from the current sensor 36. The current deviation computation unit 57 computes a deviation between the current command value obtained by the PI control unit 55 and the motor current computed by the motor current computation unit 56. The PI control unit 58 carries out PI computation on the current deviation computed by the current deviation computation unit 57. That is, the current deviation computation unit 57 and the PI control unit 58 constitute current feedback control means for bringing the motor current that flows through the valve driving motor 15 to the current command value. The PI control unit 58 carries out PI computation on the current deviation to compute a control voltage value, which is a value of the control voltage that should be applied to the valve driving motor 15.

The PWM control unit 59 generates a drive signal on the basis of the control voltage value computed by the PI control unit 58 and the rotation angle θB of the valve driving motor 15, which is computed by the rotation angle computation unit 53, and provides the drive signal to the drive circuit 42. As a result, a voltage that corresponds to the control voltage value computed by the PI control unit 58 is applied from the drive circuit 42 to the valve driving motor 15.

Figure 5:
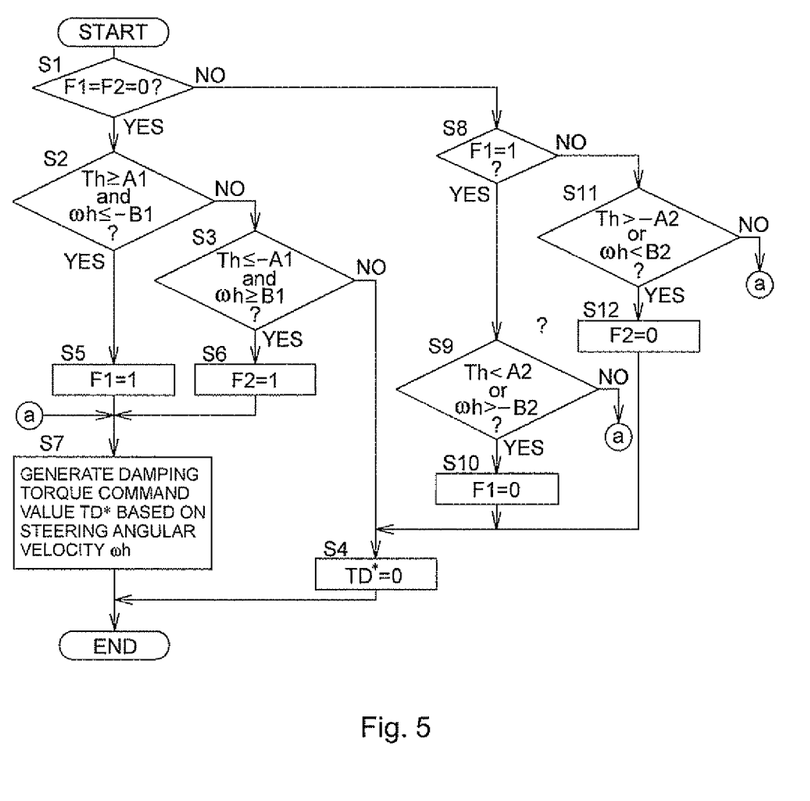
FIG. 5 is a flowchart that shows the operation of a damping control unit.

The details of an operation of the damping control unit 62 will be described. FIG. 5 is a flowchart that shows the operation of the damping control unit 62. The process in FIG. 5 is repeatedly executed at predetermined computation cycles. A first flag F1 is set (F1=1) when a first damping control start condition is satisfied in the case where the steering wheel 3 is returned from a left-turned state toward the neutral position. The first flag F1 is reset (F1=0) when a first damping control cancellation condition is satisfied. The initial value of the first flag F1 is 0. The operation mode in the case where the first flag F1 is set is referred to as a first damping control mode.

A second flag F2 is set (F2=1) when a second damping control start condition is satisfied in the case where the steering wheel 3 is returned from a right-turned state toward the neutral position. The second flag F2 is reset (F2=0) when a second damping control cancellation condition is satisfied. The initial value of the second flag F2 is 0. The operation mode in the case where the second flag F2 is set is referred to as a second damping control mode.

The damping control unit 62 first determines whether both the first flag F1 and the second flag F2 are reset (F1=F2=0) (step S1). When both the first flag F1 and the second flag F2 are reset (YES in step S1), that is, when damping control is not being executed, the damping control unit 62 executes step S2.

In step S2, the damping control unit 62 determines whether the first damping control start condition that the detected steering torque Th is larger than or equal to the first threshold A1 (A1>0) and the steering angular velocity ωh is lower than or equal to a sign-inverted value −B1 of the second threshold B1 (B1>0) is satisfied. In other words, the damping control unit 62 determines whether a condition that the direction of the detected steering torque Th is a left-turning direction, the direction of the steering angular velocity ωh is a right-returning direction, the absolute value of the detected steering torque Th is larger than or equal to the first threshold A1 and the absolute value of the steering angular velocity ωh is higher than or equal to the second threshold B1 is satisfied. The first threshold A1 is set to, for example, 1 Nm, and the second threshold B1 is set to, for example, 360 deg/s.

When the first damping control start condition is not satisfied (NO in step S2), the damping control unit 62 determines whether the second damping control start condition that the detected steering torque Th is smaller than or equal to a sign-inverted value −A1 of the first threshold A1 and the steering angular velocity ωh is higher than or equal to the second threshold B1 (B1>0) (step S3). In other words, the damping control unit 62 determines whether a condition that the direction of the detected steering torque Th is a right-turning direction, the direction of the steering angular velocity ωh is a left-returning direction, the absolute value of the detected steering torque Th is larger than or equal to the first threshold A1 and the absolute value of the steering angular velocity ωh is higher than or equal to the second threshold B1 is satisfied.

When the second damping control start condition is not satisfied (NO in step S3), the damping control unit 62 sets the damping torque command value TD* to 0 (step S4). In this case, because the damping torque command value TD* becomes 0, damping control is not executed. Then, the process in the present computation cycle ends. When it is determined in step S2 that the first damping control start condition is satisfied (YES in step S2), the damping control unit 62 sets the first flag F1 (F1=1) (step S5). In this way, the operation mode becomes the first damping control mode. Then, the damping control unit 62 generates the damping torque command value TD* on the basis of the steering angular velocity ωh (step S7). In this way, damping control is executed. The details of the process in step S7 will be described later. Then, the process in the present computation cycle ends.

When it is determined in step S3 that the second damping control start condition is satisfied (YES in step S3), the damping control unit 62 sets the second flag (F2=1) (step S6). In this way, the operation mode becomes the second damping control mode. Then, the damping control unit 62 generates the damping torque command value TD* on the basis of the steering angular velocity ωh (step S7). In this way, damping control is executed. Then, the process in the present computation cycle ends.

Figure 6:
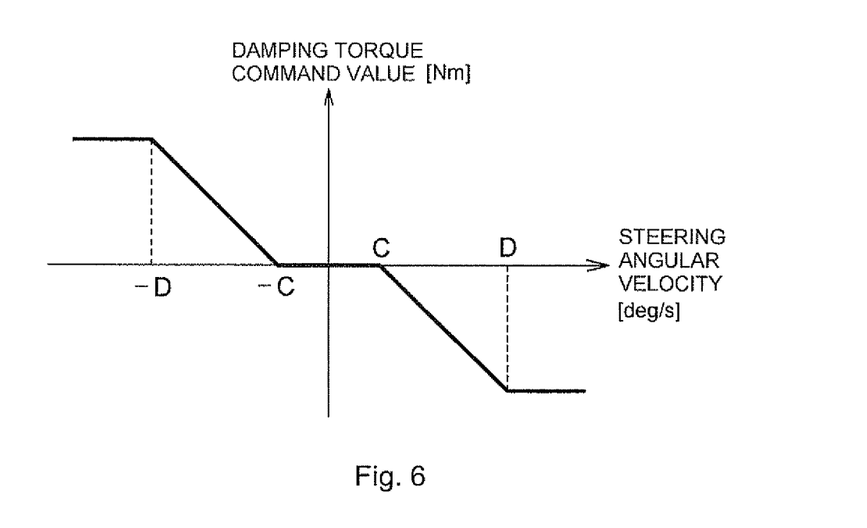
FIG. 6 is a graph that shows an example of a manner of setting a damping torque command value with respect to a steering angular velocity.

The process in step S7 will be described. FIG. 6 is a graph that shows an example of a manner of setting the damping torque command value TD* with respect to the steering angular velocity ωh. The damping torque command value TD* is set to zero when the steering angular velocity ωh falls within a predetermined range around zero (−C<ωh<C, C is a predetermined value, and C>0). When the steering angular velocity ωh falls within a negative range lower than the predetermined value −C (range in which the turning direction is the left-turning direction and the direction of the steering angular velocity ωh is the right-returning direction), the damping torque command value TD* is set to a positive value (torque command value in the leftward direction that is the same direction as the turning direction). When the steering angular velocity ωh falls within a range lower than or equal to a predetermined value −D (D>0) that is lower than the predetermined value −C, the damping torque command value TD* is fixed to a predetermined upper limit (>0). When the steering angular velocity ωh falls within a range lower than or equal to the predetermined value −C and higher than the predetermined value −D, the damping torque command value TD* is set so as to monotonously increase from 0 to the upper limit as the absolute value of the steering angular velocity ωh increases.

In the first damping control mode, the steering angular velocity ωh is a negative value. Therefore, when the steering angular velocity ωh is lower than or equal to the predetermined value −C, the damping torque command value TD* becomes a larger positive value as the absolute value of the steering angular velocity ωh increases. However, when the steering angular velocity ωh becomes lower than or equal to the predetermined value −D, the damping torque command value TD* is maintained at the upper limit. In addition, in the first damping control mode, the detected steering torque Th is a positive value. Therefore, the basic assist torque command value TAO* set by the basic assist torque command value setting unit 61 also becomes a positive value. The assist torque command value TA* is computed by adding the damping torque command value TD* to the basic assist torque command value TAO*. Therefore, in the first damping control mode, the assist torque command value TA* is larger than the basic assist torque command value TAO* by a larger amount as the absolute value of the steering angular velocity ωh increases. Thus, in the first damping control mode, the assist torque in the turning direction (in this case, left-turning direction) is increased, and damping control is achieved. In addition, the assist torque in the turning direction is increased as the absolute value of the steering angular velocity ωh increases. Therefore, convergence at the time when the steering member is returned from the left-turned state toward the neutral position improves, and the steering feel also improves.

On the other hand, when the steering angular velocity ωh falls within a positive range higher than or equal to a predetermined value C (range in which the turning direction is the right-turning direction and the direction of the steering angular velocity ωh is the left-returning direction), the damping torque command value TD* is set to a negative value (torque command value in the rightward direction that is the same direction as the turning direction). When the steering angular velocity ωh falls within a range higher than or equal to a predetermined value D that is higher than the predetermined value C, the damping torque command value TD* is fixed to a predetermined lower limit (<0). When the steering angular velocity ωh falls within a range higher than or equal to the predetermined value C and lower than the predetermined value D, the damping torque command value TD* is set so as to monotonously decrease from 0 to the lower limit as the absolute value of the steering angular velocity ωh increases.

In the second damping control mode, the steering angular velocity ωh is a positive value. Therefore, when the steering angular velocity ωh is higher than or equal to the predetermined value C, the damping torque command value TD* becomes a smaller negative value as the absolute value of the steering angular velocity ωh increases. However, when the steering angular velocity ωh is higher than or equal to the predetermined value D, the damping torque command value TD* is maintained at the lower limit. In addition, in the second damping control mode, the detected steering torque Th is a negative value. Therefore, the basic assist torque command value TAO* set by the basic assist torque command value setting unit 61 also becomes a negative value. The assist torque command value TA* is computed by adding the damping torque command value TD* to the basic assist torque command value TAO*. Therefore, in the second damping control mode, the assist torque command value TA* is a negative value that is smaller than the basic assist torque command value TAO* by a larger amount as the absolute value of the steering angular velocity ωh increases. Thus, in the second damping control mode, the assist torque in the turning direction (in this case, right-turning direction) is increased, and damping control is achieved. In addition, the assist torque in the turning direction is increased as the absolute value of the steering angular velocity ωh increases. Therefore, convergence at the time when the steering member is returned from the right-turned state toward the neutral position improves, and the steering feel also improves.

When it is determined in step S1 that at least one of the first flag F1 and the second flag F2 is not reset (NO in step S1), the damping control unit 62 determines whether the first flag F1 is set (F1=1) (step S8). When the first flag F1 is set (YES in step S8), that is, when the operation mode is the first damping control mode, the damping control unit 62 executes step S9.

In step S9, the damping control unit 62 determines whether the first damping control cancellation condition that the detected steering torque Th is smaller than a third threshold A2 (A2>0) or the steering angular velocity ωh is higher than a sign-inverted value −B2 of a fourth threshold B2 (B2>0) is satisfied. The third threshold A2 is set to a value larger than or equal to the first threshold A1. In the present embodiment, the third threshold A2 is set to the same value as the first threshold A1. The fourth threshold B2 is set to a value lower than or equal to the second threshold B1. In the present embodiment, the fourth threshold B2 is set to the same value as the second threshold B1.

When the first damping control cancellation condition is not satisfied (NO in step S9), the damping control unit 62 generates the damping torque command value TD* on the basis of the steering angular velocity ωh (step S7). In this way, damping control is executed. That is, the first damping control mode is maintained. Then, the process in the present computation cycle ends. When it is determined in step S9 that the first damping control cancellation condition is satisfied (YES in step S9), the damping control unit 62 resets the first flag F1 (F1=0) (step S10). In this way, the first damping control mode is cancelled. After that, the damping control unit 62 sets the damping torque command value TD* to 0 (step S4). Then, the process in the present computation cycle ends.

When it is determined in step S8 that the first flag F1 is not set (NO in step S8), the damping control unit 62 determines that the second flag F2 is set (F2=1) (the operation mode is the second damping control mode), and then executes step S11. In step S11, the damping control unit 62 determines whether the second damping control cancellation condition that the steering torque Th is larger than a sign-inverted value −A2 of the third threshold A2 (A2>0) or the steering angular velocity ωh is lower than the fourth threshold B2 (B2>0) is satisfied.

When the second damping control cancellation condition is not satisfied (NO in step S11), the damping control unit 62 generates the damping torque command value TD* on the basis of the steering angular velocity ωh (step S7). In this way, damping control is executed. That is, the second damping control mode is maintained. Then, the process in the present computation cycle ends. When it is determined in step S11 that the second damping control cancellation condition is satisfied (YES in step S11), the second flag F2 is reset (F2=0) (step S12). Thus, the second damping control mode is cancelled. After that, the damping control unit 62 sets the damping torque command value TD* to 0 (step S4). Then, the process in the present computation cycle ends.

Referring back to FIG. 2, the pump driving motor control unit 70 includes a pump rotation speed command value setting unit 71, a rotation angle computation unit 72, a rotation speed computation unit 73, a rotation speed deviation computation unit 74, a PI control unit 75 and a PWM control unit 76. The pump rotation speed command value setting unit 71 sets a pump rotation speed command value (motor rotation speed command value) VP* that is a command value of the rotation speed (number of revolutions) of the hydraulic pump 23 (a command value of the rotation speed of the pump driving motor 25) on the basis of the steering angular velocity ωh computed by the steering angular velocity computation unit 51.

Figure 7:
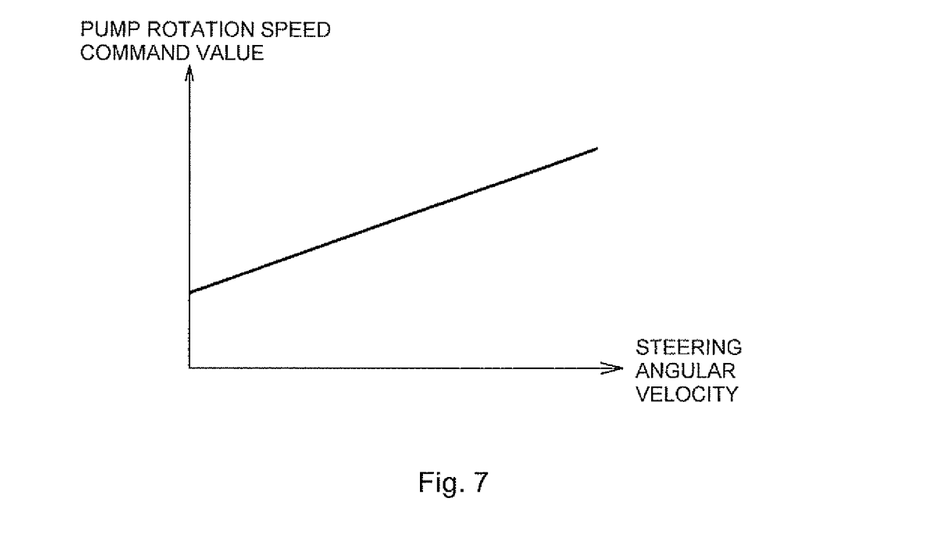
FIG. 7 is a graph that shows an example of a manner of setting a pump rotation speed command value with respect to a steering angular velocity.

Specifically, the pump rotation speed command value setting unit 71 sets the pump rotation speed command value VP* on the basis of a map that stores the correlation between the steering angular velocity and the pump rotation speed command value VP*. FIG. 7 is a graph that shows an example of a manner of setting the pump rotation speed command value VP* with respect to the steering angular velocity ωh. The pump rotation speed command value VP* is set such that the pump rotation speed command value VP* takes a predetermined lower limit when the steering angular velocity is zero and the pump rotation speed command value VP* monotonously increases with an increase in the steering angular velocity.

The rotation angle computation unit 72 computes a rotation angle θP of the pump driving motor 25 on the basis of a signal output from the rotation angle sensor 34. The rotation speed computation unit 73 computes a rotation speed (number of revolutions) VP of the pump driving motor 25 on the basis of the rotation angle θP of the pump driving motor 25, which is computed by the rotation angle computation unit 72. The rotation speed deviation computation unit 74 computes a deviation ΔVP (=VP*−VP) between the pump rotation speed command value VP* set by the pump rotation speed command value setting unit 71 and the rotation speed VP of the pump driving motor 25, which is computed by the rotation speed computation unit 73.

The PI control unit 75 carries out PI computation on the rotation speed deviation ΔVP computed by the rotation speed deviation computation unit 74. That is, the rotation speed deviation computation unit 74 and the PI control unit 75 constitute rotation speed feedback control means for bringing the rotation speed VP of the pump driving motor 25 to the pump rotation speed command value VP*. The PI control unit 75 carries out PI computation on the rotation speed deviation ΔVP to thereby compute a control voltage value that is a value of control voltage that should be applied to the pump driving motor 25.

The PWM control unit 76 generates a drive signal on the basis of the control voltage value computed by the PI control unit 75 and the rotation angle θP of the pump driving motor 25, which is computed by the rotation angle computation unit 72, and provides the drive signal to the drive circuit 43. Thus, a voltage that corresponds to the control voltage value computed by the PI control unit 75 is applied from the drive circuit 43 to the pump driving motor 25.

Figure 8:
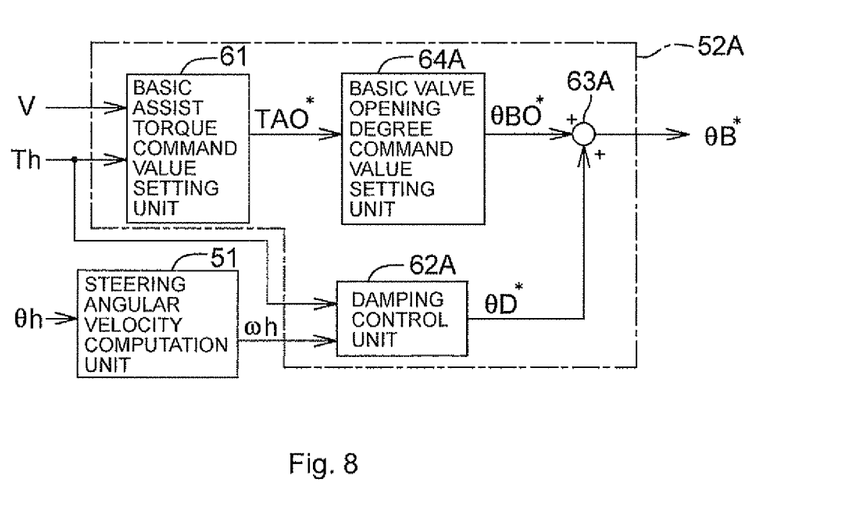
FIG. 8 is a block diagram that shows a valve opening degree command value computation unit according to an alternative embodiment of the invention.

FIG. 8 is a block diagram that shows a valve opening degree command value computation unit 52A according to an alternative embodiment of the invention. The valve opening degree command value computation unit 52A includes the basic assist torque command value setting unit 61, a basic valve opening degree command value setting unit 64A, a damping control unit 62A and an addition unit 63A. The basic assist torque command value setting unit 61, as well as the basic assist torque command value setting unit 61 shown in FIG. 2, sets a basic assist torque command value TAO* on the basis of the detected steering torque Th detected by the torque sensor 32 and the vehicle speed V detected by the vehicle speed sensor 35. The basic assist torque command value TAO* is a command value of basic assist torque that should be generated by the power cylinder 16.

The basic valve opening degree command value setting unit 64A sets a basic valve opening degree command value (motor rotation angle command value) θBO* on the basis of the basic assist torque command value TAO* set by the basic assist torque command value setting unit 61. The basic valve opening degree command value θBO* is a basic command value of the opening degree of the hydraulic control valve 14. An example of a manner of setting the basic valve opening degree command value θBO* with respect to the basic assist torque command value TAO* may be the same as the example of the manner of setting the valve opening degree command value θB* with respect to the assist torque command value TA*, shown in FIG. 4.

The damping control unit 62A executes an operation similar to that of the damping control unit 62 shown in FIG. 2. However, the damping control unit 62A generates a value that is obtained by converting the damping torque command value TD* into a value that corresponds to the valve opening degree (damping control value θD*), instead of the damping torque command value TD*. The addition unit 63A computes the valve opening degree command value θB* by adding the damping control value θD* generated by the damping control unit 62A to the basic valve opening degree command value θBO* set by the basic valve opening degree command value setting unit 64A.

What is claimed is:

1. A hydraulic power steering system that generates a steering assist force by supplying hydraulic fluid from a hydraulic pump to a power cylinder that is coupled to a steering mechanism of a vehicle, via a hydraulic control valve that is not mechanically coupled to a steering member, the hydraulic power steering system comprising:
a steering torque sensor configured to detect a steering torque that is applied to the steering member;
a valve driving motor that is used to control an opening degree of the hydraulic control valve; and
a controller including:
a steering angular velocity computation unit configured to detect a steering angular velocity of the steering member;
an opening degree command value computation unit configured to compute an opening degree command value for the hydraulic control valve; and
a valve driving motor control unit configured to control the valve driving motor based on the opening degree command value computed by the opening degree command value computation unit, wherein
the opening degree command value computation unit includes:
a basic command value setting unit configured to set a basic command value used to obtain a basic opening degree command value, using the steering torque detected by the steering torque sensor;
a damping control unit for setting a damping control value used to increase the steering assist force in a turning direction when a direction of the steering torque detected by the steering torque sensor is the turning direction, a magnitude of the steering torque is larger than or equal to a first threshold, a direction of the steering angular velocity detected by the steering angular velocity computation unit is a returning direction, and a magnitude of the steering angular velocity is higher than or equal to a second threshold; and
a valve opening degree command value setting unit configured to compute the opening degree command value based on the basic command value set by the basic command value setting unit and the damping control value set by the damping control unit.

2. The hydraulic power steering system according to claim 1, further comprising:
a vehicle speed sensor configured to detect a vehicle speed of the vehicle, wherein
the basic command value setting unit is configured to set a basic steering assist force command value as the basic command value, based on the steering torque detected by the steering torque sensor and the vehicle speed detected by the vehicle speed sensor,
the damping control unit is configured to set the damping control value that corresponds to the steering angular velocity detected by the steering angular velocity computation unit, when the direction of the steering torque detected by the steering torque sensor is the turning direction, the magnitude of the steering torque is larger than or equal to the first threshold, the direction of the steering angular velocity detected by the steering angular velocity computation unit is the returning direction, and the magnitude of the steering angular velocity is higher than or equal to the second threshold, and
the valve opening degree command value setting unit is configured to compute the opening degree command value based on the basic steering assist force command value set by the basic command value setting unit and the damping control value set by the damping control unit.

3. The hydraulic power steering system according to claim 2, wherein the damping control unit is configured to set an absolute value of the damping control value such that the absolute value of the damping control value increases as an absolute value of the steering angular velocity detected by the steering angular velocity computation unit increases, and to set a direction of the damping control value such that the direction of the damping control value is opposite to the direction of the steering angular velocity.

* * * * *